E. C. TONKIN AND H. T. COLLINS.
TAP FOR CONTROLLING THE SUPPLY OF FLUIDS.
APPLICATION FILED NOV. 13, 1919.
1,381,766. Patented June 14, 1921.
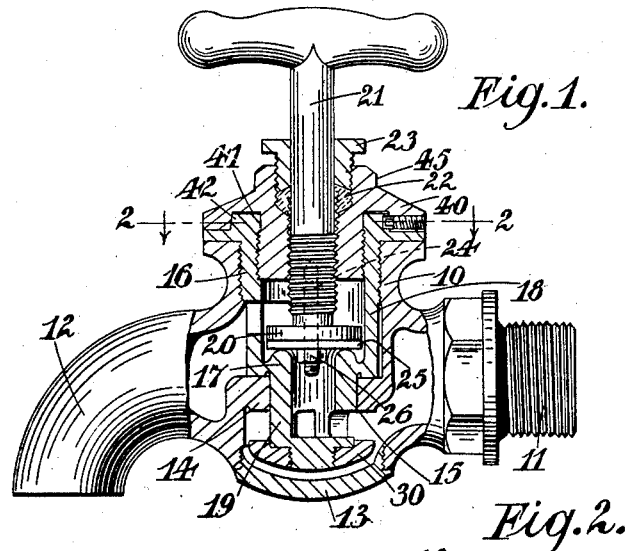
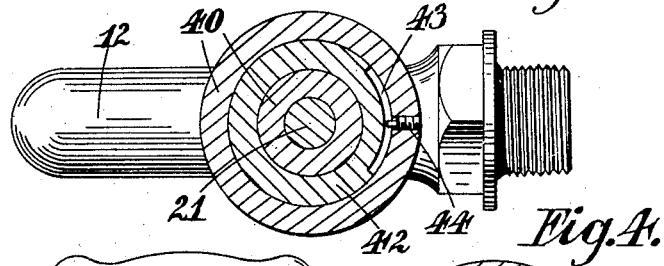
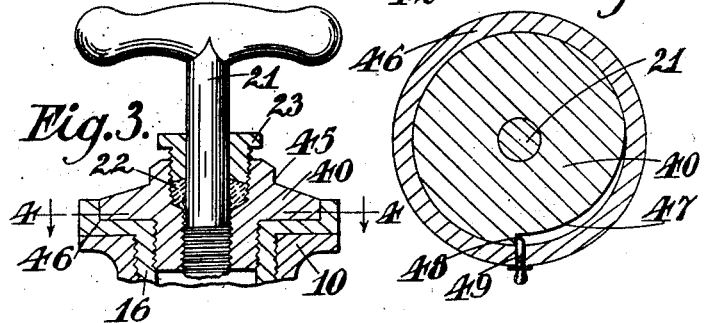

UNITED STATES PATENT OFFICE.

EDWIN CHARLES TONKIN, OF STOCKWELL, LONDON, AND HENRY THOMAS COLLINS, OF HAMPSTEAD, LONDON, ENGLAND.

TAP FOR CONTROLLING THE SUPPLY OF FLUIDS.

1,381,766.     Specification of Letters Patent.     Patented June 14, 1921.

Application filed November 13, 1919. Serial No. 337,711.

*To all whom it may concern:*

Be it known that we, EDWIN CHARLES TONKIN and HENRY THOMAS COLLINS, subjects of the King of England, residing, respectively, at Stockwell, London, England, and Hampstead, London, England, have invented certain new and useful Improvements in Taps for Controlling the Supply of Fluids, of which the following is a specification.

This invention is for improvements in or relating to taps for controlling the supply of fluids and is advantageously applied to the ordinary domestic tap, although it can also be applied to large steam and other stop valves, or used for other purposes. The tap according to the present invention is of the type comprising a main and an auxiliary valve, and in which a main valve securing member engages the auxiliary valve, or a part attached thereto to bring such auxiliary valve into its closing position. This auxiliary valve is employed to cut off the supply of fluid so that the main valve can be removed for cleaning, grinding, renewal or other treatment, when necessary.

A tap of this type is shown in our prior British Patent specification No. 6113 of 1912, and the present invention has for one of its objects to render this type of tap more efficient in operation.

According to the primary feature of the present invention there is provided a tap of the type above described which is characterized by the provision of means to lock together the securing member and the part it engages to operate the auxiliary valve. Thus the auxiliary valve may be efficiently operated by the securing member.

According to another feature of the invention the tap is provided with an extended friction surface between the securing member and the part it engages to operate the auxiliary valve. This extended friction surface is one method of insuring that the auxiliary valve may be efficiently operated by the securing member.

According to a further feature of the invention either the securing member or the part it is associated with for operating the auxiliary valve, carries a locking pin to coöperate with a recess in the other associated part. By this means positive operation of the auxiliary valve by the securing member may be obtained.

For a more complete understanding of these and other features of the invention there will now be described, with reference to the accompanying drawings and by way of example only, certain constructional forms of tap according to the invention. It is to be understood, however, that the invention is not limited to the precise constructional details enumerated.

In the accompanying drawing,

Figure 1 is an elevation, partly in section, of one construction of tap,

Fig. 2 is a section on the line 2—2 of Fig. 1.

Fig. 3 is a view corresponding to Fig. 1 but showing a modified construction of tap, and Fig. 4 is a section on the line 4—4 of Fig. 3.

Like reference numerals indicate like parts in all the figures.

The tap consists of a main body portion comprising a central approximately cylindrical chamber 10 provided with an inlet passage 11 and an outlet passage 12 on the opposite sides of it. These communicate, respectively, with the lower and upper parts of the chamber, and the main valve 20 is situated about the middle of the central chamber to control the connection between the inlet and outlet passages. The central chamber extends from the top to the bottom of the body portion and is closed at the lower end by a suitable screwed cap 13 which is secured in place after the other parts have been properly arranged. An internal flange 14 is situated about the middle of the length of the chamber 10 and constitutes at its under-side 15 the seating for the auxiliary valve 30. In the upper end of the chamber 10 there is screwed a jacket-member 16 which has a ledge 17 formed on the inside to constitute a seating for the valve 20. This jacket-member 16 may take any convenient form, and in the construction illustrated, comprises a cylinder 18 having at its lower end a tube 19 closed at the bottom but perforated at the sides to permit the entry of fluid. A boss depending from the tube 19 is screw-threaded to form a convenient support for the auxiliary valve 30. The cylinder 18 is also perforated to permit of the passage of fluid and this perforation is so positioned that when the jacket-member 16 is screwed home upon the flange 14, the perforation is in line with the outlet passage 12.

The upper end of the member 16 is screw-threaded internally to receive a main valve securing member 40 which bears upon the upper face of the member 16 to make frictional contact therewith. To provide for efficient frictional contact, for a purpose to be hereinafter indicated, the securing member 40 is, in the construction illustrated, shown as formed with a tapered annular recess 41 which receives a correspondingly tapered extension 42 on the end of the member 16. By this means an extended friction surface is provided between these two parts. Obviously, instead of the member 40 being recessed, the member 16 could be recessed to receive a coresponding projection from the member 40, and instead of the approximately rectangular recess and projection shown in the attached drawings, some other form of extended frictional surface could be employed.

The extension 42 may be grooved as shown at 43 to receive the end of a locking-pin, say a screw 44 in the member 40. By employing an elongated groove 43, a certain amount of scope for adjustment of the members 40 and 16 relatively to each other will be permitted, but it will be seen that when once the end of the grub-screw 44 encounters the end of the groove 43 the two parts 40 and 16 must turn together. The member 40 is preferably provided with a hexagonal or other flattened portion 45 upon it to facilitate its being screwed and unscrewed.

The stem 21 of the main valve is screwed into the member 40 and provided with a suitable packing 22 held in place by a gland 23.

The valve 20 may be formed separate from the stem 21 and have an extension 24 fitting into a recess in the latter. This valve 20 may be provided with a washer 25 held in place by a nut 26 to bear upon the seating 17.

The operation of the tap is as follows:—
When the valve 20 is screwed down upon its seat, all communication between the inlet passage and the outlet passage is cut off. On raising the valve 20 off its seat, fluid can flow from the inlet passage 11 through the openings in the tube 19 and thence past the seating 17 and out by the perforation in the sleeve 18 to the outlet passage 12.

If it is desired to remove the main valve 20 for repair or other reason, the securing member 40 is turned by any convenient means and will frictionally carry with it the jacket-member 16. This latter is raised as it is unscrewed from the body of the tap and the motion is continued until the valve 30 bears hard against its seat 15 and cuts off the supply of fluid. Continued rotation of the member 40 will then unscrew it from the jacket-member 16.

In most cases it is thought that the frictional contact provided by the construction herein described will be sufficient for efficient operation of the tap, but should it be found desirable to include the grub-screw 44, then it will be understood that this must be unscrewed sufficiently far to release its end from the groove 43 before the member 40 can be unscrewed in the jacket-member 16.

If desired the grub-screw 44 may be replaced by a sliding pin and when the grub-screw or pin together with their coöperating groove 43 are employed the tapering of the recess 41 and extension 42 may be dispensed with, the positive locking effect given by the grub-screw or pin when it comes into contact with the shoulder at the end of a groove 43 being solely relied upon to turn the member 16 with the member 14.

In the construction shown in Figs. 3 and 4 the member 16 is extended at 46 to inclose the outer edge of the member 40, which latter is cut away as indicated at 47 to form a shoulder 48. Carried in the extension 46 is a sliding pin 49 intended to coöperate with the shoulder 48 to lock the parts 16 and 40 together when desired. The construction of tap shown in these two figures operates in the same manner as does the construction shown in Figs. 1 and 2.

What we claim as our invention and desire to secure by Letters Patent is:—

1. In a tap for controlling the supply of fluids the combination with a main and an auxiliary valve of a single securing and operating member which secures the main valve in place and which operates the auxiliary valve to bring it into and out of closing position and means to lock together the securing and operating member and the auxiliary valve to permit the latter to be operated, said locking means comprising contacting faces on the said member and auxiliary valve, which faces lie approximately parallel to the direction in which the said valve moves into and out of closing position.

2. In a tap for controlling the supply of fluids the combination with a main and an auxiliary valve of a main valve securing and auxiliary valve operating member and an extended friction surface between the securing and operating member and the auxiliary valve to permit the latter to be operated, part of said friction surface lying approximately parallel to the direction in which the said valve moves into and out of closing position.

3. In a tap for controlling the supply of fluids the combination with a main and an auxiliary valve of a main valve securing and auxiliary valve operating member and a coöperating tapered recess and extension between the securing and operating member and the auxiliary valve to permit the latter to be operated.

4. In a tap for controlling the supply of fluids the combination with a main and an auxiliary valve of a securing and operating member which secures the main valve in place and which operates the auxiliary valve to bring it into and out of closing position and means to lock together the securing and operating member and the auxiliary valve to permit the latter to be operated, said locking means comprising contacting faces on the said member and auxiliary valve, which faces lie approximately parallel to the direction in which the said valve moves into and out of closing position.

5. In a tap for controlling the supply of fluids the combination with a main and an auxiliary valve of a single securing and operating member which secures the main valve in place and which operates the auxiliary valve to bring it into and out of closing position, a locking pin operatively carried by the securing and operating member and a shoulder in a recess in the auxiliary valve, into which recess the pin projects and with which shoulder the pin contacts to lock together the securing and operating member and the auxiliary valve to permit the latter to be operated, the relative dimensions of the pin and recess being such as to permit lost motion between the securing and operating member and the auxiliary valve, whereby the former can be adjusted within limits to secure the main valve in place without operating the auxiliary valve.

6. In a tap for controlling the supply of fluids the combination with a main and an auxiliary valve of a single securing and operating member which secures the main valve in place and which operates the auxiliary valve to bring it into and out of closing position, a locking pin operatively carried by the securing and operating member and a shoulder at the end of a cut-away portion in the auxiliary valve, into which cut-away portion the pin projects and with which shoulder the pin contacts to lock together the securing and operating member and the auxiliary valve to permit the latter to be operated, the relative dimensions of the pin and cut-away portion being such as to permit lost motion between the securing and operating member and the auxiliary valve, whereby the former can be adjusted within limits to secure the main valve in place without operating the auxiliary valve.

7. In a tap for controlling the supply of fluids, the combination with a main and an auxiliary valve of the screw-down type, of a seating member movable along the path of travel of the main valve, an internal flange in the body of the tap on one side of which the seating member normally rests, the other side of said flange comprising a seating for the auxiliary valve, a seating in the seating member for the main valve, an extension from such main valve seating carrying the auxiliary valve which valve is normally held off its seat, a main valve securing and seating operating member and means to lock said securing and operating member and said seating member together to permit of operation of the auxiliary valve, said locking means comprising contacting faces on both of said last named members, which faces lie approximately parallel to the direction of which the seating member moves.

8. In a tap for controlling the supply of fluids, the combination with a main and an auxiliary valve of the screw-down type, of a seating member movable along the path of travel of the main valve, an internal flange in the body of the tap on one side of which the seating member normally rests, the other side of said flange comprising a seating for the auxiliary valve, a seating in the seating member for the main valve, an extension from such main valve seating carrying the auxiliary valve which valve is normally held off its seat, a main valve securing and seating operating member, a locking pin operatively carried by the securing and operating member and a shoulder in a recess in the seating member, into which recess the pin projects and with which shoulder the pin contacts to lock together the securing and operating member and said seating member to permit of operation of the auxiliary valve, the relative dimensions of the pin and recess being such as to permit lost motion between the securing and operating member and the seating member.

9. In a tap for controlling the supply of fluids, the combination with a main and an auxiliary valve of the screw-down type, of a seating member movable along the path of travel of the main valve, an internal flange in the body of the tap on one side of which the seating member normally rests, the other side of said flange comprising a seating for the auxiliary valve, a seating in the seating member for the main valve, an extension from such main valve seating carrying the auxiliary valve which valve is normally held off its seat, a main valve securing and seating operating member, a locking pin operatively carried by the securing and operating member and a shoulder at the end of a cut-away portion in the seating member, into which cut-away portion the pin projects and with which shoulder the pin contacts to lock together the securing and operating member and the seating member to permit of operation of the auxiliary valve, the relative dimensions of the pin and cut-away portion being such as to permit lost motion between the securing and operating member and the seating member.

10. In a tap for controlling the supply of fluids, the combination with a main and an auxiliary valve of the screw-down type, of a seating member movable along the path of travel of the main valve, an internal flange in the body of the tap on one side of which the seating member normally rests, the other side of said flange comprising a seating for the auxiliary valve, a seating in the seating member for the main valve, an extension from such main valve seating carrying the auxiliary valve which valve is normally held off its seat, a main valve securing and seating operating member, means to lock together the securing and operating member and the seating member, said locking means comprising a locking pin operatively carried by one of said members to be locked together and a shoulder in a recess in the other of said members, into which recess the pin projects and with which shoulder the pin contacts to lock together the said parts and permit of operation of the auxiliary valve, the relative dimensions of the pin and recess being such as to permit lost motion between the securing and operating member and the seating member.

11. In a tap for controlling the supply of fluids, the combination with a main and an auxiliary valve of an operating member for said auxiliary valve which member also operates to secure in position the main valve, and means to lock together the securing and operating member and the auxiliary valve to permit the latter to be operated, said locking means comprising an extended friction surface between the securing and operating member and the auxiliary valve, whereof a part lies approximately parallel to the direction in which the auxiliary valve moves into and out of closing position.

12. In a tap for controlling the supply of fluids, the combination with a main and an auxiliary valve of an operating member for said auxiliary valve which member also operates to secure in position the main valve, and means to lock together the securing and operating member and the auxiliary valve to permit the latter to be operated, said locking means comprising a coöperating recess and extension between the securing and operating member and the auxiliary valve, a locking pin operatively carried by the securing and operating member and a shoulder in a recess in the auxiliary valve, into which recess the pin projects and with which shoulder the pin contacts to lock together the securing and operating member and the auxiliary valve to permit the latter to be operated.

13. In a tap for controlling the supply of fluids, the combination with a main and an auxiliary valve of an operating member for said auxiliary valve which member also operates to secure in position the main valve, and means to lock together the securing and operating member and the auxiliary valve to permit the latter to be operated, said locking means comprising a coöperating recess and extension between the securing and operating member and the auxiliary valve, a locking pin operatively carried by the securing and operating member and a shoulder at the end of a cut-away portion in the auxiliary valve into which cutaway portion the pin projects and with which shoulder the pin contacts to lock together the securing and operating member and the auxiliary valve to permit the latter to be operated, the relative dimensions of the pin and cut-away portion being such as to permit lost motion between the securing and operating member and the auxiliary valve, whereby the former can be adjusted within limits without operating the auxiliary valve.

14. In a tap for controlling the supply of fluids, the combination with a main and an auxiliary valve of the screw-down type of a seating member movable along the path of travel of the main valve, an internal flange in the body of the tap on one side of which the seating member normally rests, the other side of said flange comprising a seating for the auxiliary valve, a seating in the seating member for the main valve, an extension from such main valve seating carrying the auxiliary valve which valve is normally held off its seat, an operating member for said seating member which member also operates to secure in position the main valve and means to lock together the securing and operating member and said seating member to permit of operation of the auxiliary valve, said locking means comprising an extended friction surface between the securing and operating member and the seating member, whereof a part lies approximately parallel to the direction in which the seating member moves.

15. In a tap for controlling the supply of fluids, the combination with a main and an auxiliary valve of the screw-down type of a seating member movable along the path of travel of the main valve, an internal flange in the body of the tap on one side of which the seating member normally rests, the other side of said flange comprising a seating for the auxiliary valve, a seating in the seating member for the main valve, an extension from such main valve seating carrying the auxiliary valve which valve is normally held off its seat, an operating member for said seating member which member also operates to secure in position the main valve, and a coöperating recess and extension between the securing and operating member and the seating member to permit of operation of the auxiliary valve.

16. In a tap for controlling the supply of fluids, the combination with a main and an auxiliary valve of the screw-down type of a seating member movable along the path of travel of the main valve, an internal flange in the body of the tap on one side of which the seating member normally rests, the other side of said flange comprising a seating for the auxiliary valve, a seating in the seating member for the main valve, an extension from such main valve seating carrying the auxiliary valve which valve is normally held off its seat, an operating member for said seating member which member also operates to secure in position the main valve, and means to lock together the securing and operating member and the seating member and permit the auxiliary valve to be operated, said locking means comprising a coöperating recess and extension between the securing and operating member and the seating member, a locking pin operatively carried by one of said members and a shoulder at the end of a cut-away portion in the other of said members, into which recess the pin projects and with which shoulder the pin contacts to lock together the securing and operating member and said seating member to permit of operation of the auxiliary valve, the relative dimensions of the pin and recess being such as to permit lost motion between the securing and operating member and the seating member whereby the former can be adjusted within limits without operating the auxiliary valve.

17. In a tap for controlling the supply of fluids, the combination with a main and an auxiliary valve of the screw-down type of a seating member movable along the path of travel of the main valve, an internal flange in the body of the tap on one side of which the seating member normally rests, the other side of said flange comprising a seating for the auxiliary valve, a seating in the seating member for the main valve, an extension from such main valve seating carrying the auxiliary valve which valve is normally held off its seat, an operating member for said seating member which member also operates to secure in position the main valve, and means to lock together the securing and operating member and the seating member and permit the auxiliary valve to be operated, said locking means comprising a coöperating recess and extension between the securing and operating member and the seating member, a locking pin operatively carried by the securing and operating member and a shoulder at the end of a cut-away portion in said seating member to lock together the securing and operating member and said seating member to permit of operation of the auxiliary valve, the relative dimensions of the pin and recess to be such as to permit lost motion between the securing and operating member and the seating member, whereby the former can be adjusted within limits without operating the auxiliary valve.

18. In a tap for controlling the supply of fluids, the combination with a main and an auxiliary valve, of a single securing and operating member which secures the main valve in place and which operates the auxiliary valve to bring it into and out of closing position, and means to lock together the securing and operating member and the auxiliary valve, said locking means comprising a locking pin operatively carried by one of said members to be locked together and a shoulder in a recess in the other of said members, into which recess the pin projects and with which shoulder the pin contacts to lock together the said parts and permit the auxiliary valve to be operated, the relative dimensions of the pin and recess being such as to permit lost motion between the securing and operating member and the auxiliary valve whereby the former can be adjusted within limits to secure the main valve in place without operating the auxiliary valve, substantially as described.

19. In a tap for controlling the supply of fluids, the combination with a main and an auxiliary valve, of a main valve securing and auxiliary valve operating member, and means to lock together the securing and operating member and the auxiliary valve to permit the latter to be operated, said locking means comprising a coöperating recess and extension between the securing and operating member and the auxiliary valve, a locking pin operatively carried by one of said members and a shoulder in a recess in the other of said members into which recess the pin projects and with which shoulder the pin contacts to lock together the securing and operating member and the auxiliary valve and permit the latter to be operated, the relative dimensions of the pin and recess being such as to permit lost motion between the securing and operating member and the auxiliary valve whereby the former can be adjusted within limits without operating the auxiliary valve, substantially as described.

In testimony whereof we have signed our names to this specification in the presence of two subscribing witnesses.

EDWIN CHARLES TONKIN.
HENRY THOMAS COLLINS.

Witnesses:
C. A. RATTENBURY,
W. M. CAMPBELL.